United States Patent
Uchikoshi et al.

(10) Patent No.: US 12,204,341 B2
(45) Date of Patent: Jan. 21, 2025

(54) TRAVEL ASSISTANCE APPARATUS, TRAVEL ASSISTANCE SYSTEM, AND TRAVEL ASSISTANCE METHOD

(71) Applicant: Panasonic Intellectual Property Management Co., Ltd., Osaka (JP)

(72) Inventors: Tadahiro Uchikoshi, Kanagawa (JP); Masahito Oishi, Kanagawa (JP); Kojiro Ono, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 374 days.

(21) Appl. No.: 17/953,701

(22) Filed: Sep. 27, 2022

(65) Prior Publication Data

US 2023/0014006 A1 Jan. 19, 2023

Related U.S. Application Data

(63) Continuation of application No. PCT/JP2021/012224, filed on Mar. 24, 2021.

(30) Foreign Application Priority Data

Mar. 30, 2020 (JP) ................... 2020-060566

(51) Int. Cl.
  *G06F 9/455* (2018.01)
  *G05D 1/00* (2024.01)
(52) U.S. Cl.
  CPC ....... *G05D 1/0272* (2013.01); *G06F 9/45558* (2013.01); *G06F 2009/45591* (2013.01)
(58) Field of Classification Search
  CPC ... B60W 2050/0006; B60W 2050/021; B60W 2050/0292; B60W 2554/4041;
  (Continued)

(56) References Cited

U.S. PATENT DOCUMENTS

2018/0178781 A1\* 6/2018 Funk ................. H04W 4/70
2019/0039610 A1 2/2019 Mukai et al.
(Continued)

FOREIGN PATENT DOCUMENTS

JP 2017-142787 8/2017

OTHER PUBLICATIONS

International Search Report (ISR) from International Searching Authority (Japan Patent Office) in International Pat. Appl. No. PCT/JP2021/012224, dated Jun. 8, 2021, together with an English language translation.

*Primary Examiner* — Charles J Han
(74) *Attorney, Agent, or Firm* — Greenblum & Bernstein, P.L.C.

(57) ABSTRACT

The travel assistance apparatus includes: a first Operating System (OS) that controls execution of at least one of a first application and/or a second application, the first application being for specifying a first travel control amount of a vehicle based on first movement information on a position and a speed of an object around the vehicle, the second application being for specifying a second travel control amount of the vehicle based on second movement information on a position and a speed of the object; a second OS that controls execution of a third application for performing travel control of the vehicle based on at least one of the first travel control amount and/or the second travel control amount; and a hypervisor that is executed on a processor and controls execution of the first OS and the second OS.

20 Claims, 7 Drawing Sheets

(58) Field of Classification Search
CPC ..... B60W 2554/4042; B60W 2556/65; B60W 30/09; B60W 30/0956; B60W 50/0205; B60W 50/029; G05D 1/0272; G06F 11/07; G06F 2009/45591; G06F 9/45558; G08G 1/09
See application file for complete search history.

(56) References Cited

U.S. PATENT DOCUMENTS

2019/0047559 A1* 2/2019 Conde ................... B60W 50/14
2020/0064842 A1* 2/2020 Kentley-Klay ...... G05D 1/0027

* cited by examiner

TRAVEL ASSISTANCE APPARATUS, TRAVEL ASSISTANCE SYSTEM, AND TRAVEL ASSISTANCE METHOD

TECHNICAL FIELD

The present disclosure relates to a travel assistance apparatus, a travel assistance system, and a travel assistance method.

BACKGROUND ART

The Patent Literature (hereinafter referred to as "PTL") discloses a technique for assisting the traveling of a vehicle for the purpose of avoiding a collision of the vehicle with an object present around the vehicle, based on movement-information acquired from the object, in addition to movement information acquired from detection devices installed in the vehicle.

CITATION LIST

Patent Literature

PTL: Japanese Patent Application Laid-Open No. 2017-142787

SUMMARY OF INVENTION

Technical Problem

However, in this type of related art, only one Operating System (OS) is used to execute both of specifying a travel control amount of a vehicle and controlling travel of the vehicle based on the specified travel control amount. Therefore, for example, when a temporary trouble occurs in the OS, execution of both of specifying the travel control amount of the vehicle and controlling the travel of the vehicle becomes impossible at the same time, or possibly becomes unstable.

A non-limiting embodiment of the present disclosure facilitates providing a travel assistance apparatus, a travel assistance system, and a travel assistance method each capable of improving the stability of both specifying a travel control amount of a vehicle and controlling travel of the vehicle.

Solution to Problem

A travel assistance apparatus according to an exemplary embodiment of the present disclosure includes: a first Operating System (OS) that controls execution of at least one of a first application and/or a second application, the first application being for specifying a first travel control amount of a vehicle based on first movement information on a position and a speed of an object around the vehicle detected by a detection apparatus mounted on the vehicle, the second application being for specifying a second travel control amount of the vehicle based on second movement information on a position and a speed of the object received from the object via a communication apparatus mounted on the vehicle; a second OS that controls execution of a third application for performing travel control of the vehicle based on at least one of the first travel control amount and/or the second travel control amount; and a hypervisor that is executed on a processor and controls execution of the first OS and the second OS.

A travel assistance system according to an exemplary embodiment of the present disclosure includes: a first Operating System (OS) that controls execution of at least one of a first application and/or a second application, the first application being for specifying a first travel control amount of a vehicle based on first movement information on a position and a speed of an object around the vehicle detected by a detection apparatus mounted on the vehicle, the second application being for specifying a second travel control amount of the vehicle based on second movement information on a position and a speed of the object received from the object via a communication apparatus mounted on the vehicle; a second OS that controls execution of a third application for performing travel control of the vehicle based on at least one of the first travel control amount and/or the second travel control amount; and a hypervisor that is executed on a processor and controls execution of the first OS and the second OS.

A travel assistance method according to an exemplary embodiment of the present disclosure is executed in a travel assistance apparatus, the travel assistance method including: controlling, by a first OS, execution of at least one of a first application and/or a second application, the first application being for specifying a first travel control amount of a vehicle based on first movement information on a position and a speed of an object around the vehicle detected by a detection apparatus mounted on the vehicle, the second application being for specifying a second travel control amount of the vehicle based on second movement information on a position and a speed of the object received from the object via a communication apparatus mounted on the vehicle; controlling, by a second OS, execution of a third application for performing travel control of the vehicle based on at least one of the first travel control amount and/or the second travel control amount; and controlling, by a hypervisor that is executed on a processor, execution of the first OS and the second OS.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
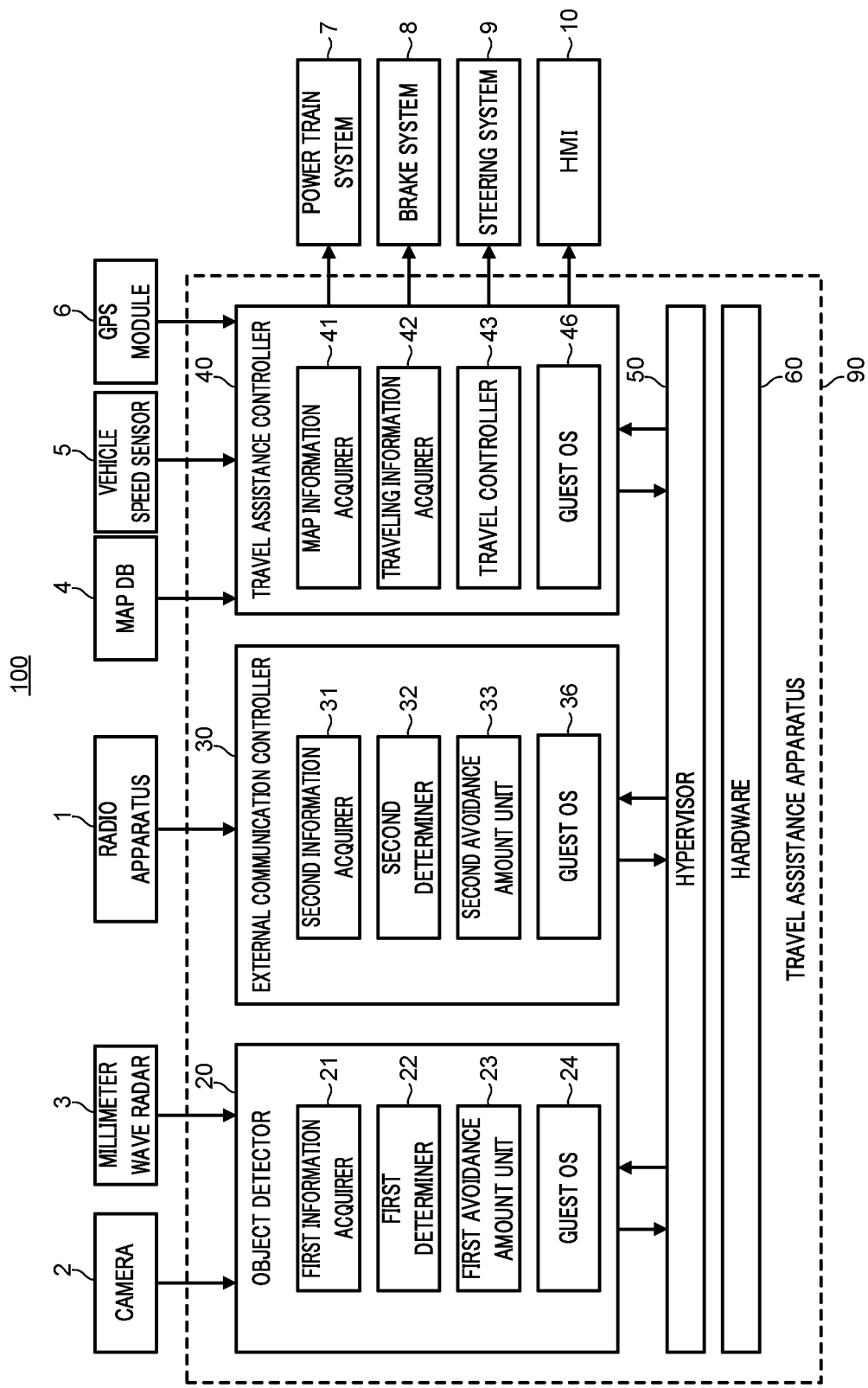
FIG. 1 illustrates a configuration example of travel assistance system 100 according to an embodiment of the present disclosure.

Preferred embodiments of the present disclosure will be described in detail with reference to the attached drawings. Note that elements having substantially the same functions are assigned the same reference numerals in the description and drawings to omit duplicated descriptions thereof.

EMBODIMENT

First, a description will be given of the background leading to the creation of an embodiment according to the present disclosure. In a publicly known art (e.g., technique described in PTL), only one Operating System (OS) is used to execute both of a process for specifying a travel control amount of a vehicle and controlling travel of the vehicle based on the specified travel control amount. Therefore, for example, when a temporary trouble occurs in the OS, execution of both of specifying the travel control amount of the vehicle and controlling the travel of the vehicle becomes impossible at the same time, or possibly becomes unstable. Perhaps, in a case where a trouble occurs in software for specifying the travel control amount of the vehicle and thus specifying the travel control amount becomes temporarily impossible, the trouble may spread to the OS or spread to other software, resulting in that the travel control of the vehicle may be also impossible.

Further, in the technique described in PTL, only one OS is used to execute specifying a first travel control amount based on movement information acquired from detection devices installed in the vehicle and specifying a second travel control amount based on movement information acquired from an object present around the vehicle. Therefore, for example, when a temporary trouble occurs in the OS, execution of all of specifying the first travel control amount, specifying the second travel control amount, and controlling the travel of the vehicle becomes impossible at the same time, or possibly becomes unstable. Accordingly, it is desired that the stability or the robustness can be improved with respect to all of specifying of the first travel control amount of the vehicle, specifying the second travel control amount of the vehicle, and controlling the travel of the vehicle. In the following, an embodiment according to the present disclosure will be described.

FIG. 1 illustrates a configuration example of travel assistance system 100 according to the embodiment of the present disclosure. Travel assistance system 100 is mounted on a vehicle such as a passenger vehicle, a freight vehicle, a ride-sharing vehicle, and the like. Travel assistance system 100 is configured to have a redundant configuration of detection methods for detecting an object around the vehicle, so that even when a trouble occurs in any of the detection methods, the vehicle can avoid colliding with the object around the vehicle.

As illustrated in FIG. 1, travel assistance system 100 includes, for example, radio apparatus 1, camera 2, millimeter wave radar 3, map Database (DB) 4, vehicle speed sensor 5, Global Positioning System (GPS) module 6, power train system 7, brake system 8, steering system 9, Human Machine Interface (HMI) 10, and travel assistance apparatus 90. Travel assistance apparatus 90 also includes, for example, object detector 20, external communication controller 30, travel assistance controller 40, hypervisor 50, and hardware 60.

Radio apparatus 1 is an exemplary communication apparatus according to the present disclosure. Radio apparatus 1 is capable of transmitting and receiving information, in between with an apparatus mounted on the object present around the vehicle, by using radio communication based on a predetermined communication standard (e.g., mobile communication (e.g., Wideband Code Division Multiple Access (W-CDMA) or Long Term Evolution (LTE)), wireless LAN (Local Area Network), Bluetooth (registered trademark), Wi-Fi (registered trademark), Vehicle to Vehicle (V2V), Vehicle to Everything (V2X), or the like). Incidentally, examples of the apparatuses mounted on the object include a communication method mounted on a preceding vehicle or a following vehicle, a terminal device owned by a person present around the vehicle, a center server, V2X communication equipment, and the like.

Camera 2 is an exemplary detection apparatus according to the present disclosure. Camera 2 is an external imager such as an omnidirectional camera and/or a panoramic camera that includes an imaging element such as a Charge Coupled Device (CCD) and/or a Complementary Metal Oxide Semiconductor (CMOS) and images a video (including still images) around the vehicle. In the following, a video around the vehicle is referred to as a "surroundings video." Examples of the surroundings videos include a landscape in front of the vehicle, a landscape on the side of the vehicle (driver-seat-door side of vehicle or passenger-seat-door side of vehicle), a landscape behind of the vehicle, and the like. Examples of the landscapes include an object present on a roadway on which the vehicle is traveling and the like. Examples of the objects present on the roadway include a vehicle, a person, an animal, and the like.

Camera 2 is positioned on, for example, a position where landscapes outside the vehicle can be imaged. Such position includes a front grill, a side mirror, a ceiling, a rear bumper, and the like. Camera 2 includes an image processor that is not illustrated. The image processor detects an object present around the vehicle by analyzing an image captured by camera 2 and inputs, to object detector 20, object detection information, which is information indicating that the object present around the vehicle has been detected. The detailed configuration of object detector 20 will be described later.

Millimeter wave radar 3 is an exemplary detection apparatus according to the present disclosure. Millimeter wave radar 3 is a sensor for detecting a position of an object present around the vehicle. Millimeter wave radar 3 is provided, for example, in front, behind, on the side or the like of the vehicle. For example, when millimeter wave radar 3 provided in front of the vehicle oscillates a millimeter wave, the millimeter wave is reflected upon hitting an object present in front of the vehicle, and thus, part of the pulsed sound wave returns to millimeter wave radar 3. The longer a distance from the vehicle to the object is, the longer a time between the oscillation of the millimeter wave from millimeter wave radar 3 and the return the part thereof to millimeter wave radar 3. Taking advantage of this relation, millimeter wave radar 3 estimates a distance to the object by measuring a round-trip time from the oscillation of the millimeter wave to the return of a millimeter wave reflected by the object to millimeter wave radar 3, and detects, based on the estimated distance and an arrangement position of millimeter wave radar 3, a position of the object with respect to the vehicle. For example, millimeter wave radar 3 provided in front of the vehicle is capable of detecting an object present in a front position several meters to several tens of meters away from the vehicle. Millimeter wave radar 3 inputs, to object detector 20, object position information, which is information indicating a position of the detected object.

Incidentally, as a sensor for detecting a position of an object present around the vehicle, travel assistance system 100 may be provided with, for example, Light Detection And Ranging (LIDAR) that applies a laser beam, an ultrasound sonar that oscillates an ultrasound wave, and the like, instead of millimeter wave radar 3. Incidentally, the LIDAR and the ultrasound sonar are also exemplary detection apparatuses according to the present disclosure.

Map DB4 stores map information such as a dynamic map, a 3D high-definition maps, and the like. Vehicle speed sensor 5 detects a current vehicle speed of the vehicle and inputs vehicle speed information indicating the detected speed to travel assistance controller 40.

GPS module 6 receives a GPS signal transmitted from a satellite, positions a position of a vehicle on which GPS module 6 is mounted, and inputs, to travel assistance controller 40, vehicle position information that is a positioning result.

Powertrain system 7, for example, controls an opening and a fuel injection amount of a throttle apparatus mounted on a vehicle having an internal combustion engine, based on driving force control information input from travel assistance controller 40.

Brake system 8 controls an actuator provided in a hydraulic circuit of a hydraulic brake based on braking force control information input from travel assistance controller 40. For an electric vehicle, brake system 8 may generate a braking force from a regenerative brake by controlling a driving apparatus of a traction motor for traveling based on the braking force control information input from travel assistance controller 40.

Steering system 9 sets a traveling direction of the vehicle by driving a steering handle based on steering amount control information input from travel assistance controller 40.

HMI 10 is a user interface that accepts an input operation of an occupant of the vehicle. HMI 10 includes, for example, a touchscreen for setting a destination of the vehicle, a button for the occupant to switch a traveling mode of the vehicle, and the like.

(Configuration of Object Detector 20)

As illustrated in FIG. 1, object detector 20 includes, for example, first information acquirer 21, first determiner 22, first avoidance amount unit 23, and guest OS 24. Here, first avoidance amount unit 23 is an exemplary first application according to the present disclosure. Further, guest OS 24 is an exemplary first OS according to the present disclosure. In FIG. 1, an example is illustrated in which first information acquirer 21, first determiner 22, and first avoidance amount unit 23 are configured separately from one another, but the present disclosure is not limited to such an example. Any two or more of these may be integrally configured as, for example, an integral application.

For example, object detector 20 first acquires a detection result by a detection apparatus such as camera 2 and millimeter wave radar 3 from the detection apparatus. Guest OS 24 of object detector 20 then controls execution of first avoidance amount unit 23. Thus, first avoidance amount unit 23 can specify a first travel control amount of the vehicle according to first movement information that is based on the detection result and related to a position and speed of the object around the vehicle. Here, the first travel control amount may be, for example, a first avoidance amount indicating the travel control amount required for avoiding a collision of the vehicle with the object of interest.

A function of object detector 20 will be described in more detail below. First information acquirer 21 acquires the object detection information and the object position information and inputs these pieces of information to first determiner 22.

First determiner 22 inputs the object detection information and the object position information acquired by first information acquirer 21 and traveling information acquired by traveling information acquirer 42 (to be described later) of travel assistance controller 40. First determiner 22 then estimates, based on these pieces of information, for example, a speed of the vehicle, a position of the vehicle, a position of an object around the vehicle, and the like. In addition, first determiner 22 calculates a time until the vehicle collides with the object around the vehicle, based on these estimated pieces of information. The shorter the calculated time is, the higher the possibility that the vehicle will collide with the object around the vehicle (hereinafter referred to as "first possibility") is.

First determiner 22 compares, for example, a value indicating the first possibility with a first threshold value with which it can be determined that the vehicle collides with the object around the vehicle. In a case where the value indicating the first possibility is equal to or greater than the first threshold value, first determiner 22 generates first avoidance control information indicating a control amount of the first avoidance travel required for avoiding a collision of the vehicle with the object around the vehicle, and inputs the resulting information to first avoidance amount unit 23.

Examples of the first avoidance travels include to assist braking by forcibly applying brakes, to change a course of the vehicle by forcibly changing a steering amount of the handle, lowering the speed of the vehicle by bringing the vehicle into an accelerator-off state even when a driver steps on the accelerator pedal, and the like.

First avoidance amount unit 23 inputs the first avoidance control information and sets the first avoidance amount required for avoiding a collision of the vehicle with the object around the vehicle. First avoidance amount unit 23 then generates first avoidance amount information indicating the first avoidance amount that has been set, and inputs the first avoidance amount information to travel controller 43. Examples of the first avoidance amounts include a braking amount of the brake, a steering amount of the handle, and the like that are required for avoiding a collision of the vehicle with the object around the vehicle.

Guest OS 24 is an operating system (OS) that controls execution of an application in which object detector 20 generates the first avoidance amount. The application is a first application for specifying the first travel control amount of the vehicle based on the first movement information on the position and speed of the object around the vehicle detected by the detection apparatus mounted on the vehicle (e.g., camera 2 or millimeter wave radar 3). Incidentally, the first application may be the same as first avoidance amount unit 23 or may include at least first avoidance amount unit 23. Further, for example, Automotive Safety Integrity Level (ASIL)-B may be applied to the application.

The ASIL is an index that specifies safety requirements and safety measures for automobiles, which is defined in ISO 26262 that is a functional safety standard for the automotive industry. The ASIL has five safety levels D, C, B, A, and QM defined in descending order of safety standards. For example, an airbag, an anti-lock brake system, a power steering, and the like have the highest risk caused by a failure, and thus, ASIL-D, which is the most stringent requirement for ensuring safety, is applied to these mechanisms. Note that ASIL-A is applied to backlights, ASIL-B is applied to headlights, brake lamps, and the like, and ASIL-C is applied to a cruise control. In this case, guest OSs may have high safety standards, in descending order of guest OS 30A1, guest OS 50I, and guest OS 30C1, for example.

(Configuration of External Communication Controller 30)

As illustrated in FIG. 1, external communication controller 30 includes, for example, second information acquirer 31, second determiner 32, second avoidance amount unit 33, and guest OS 36. Here, second avoidance amount unit 33 is an exemplary second application according to the present disclosure. Further, guest OS 36 is an exemplary first OS and fourth OS according to the present disclosure. Note that, in FIG. 1, an example is illustrated in which second information acquirer 31, second determiner 32, and second avoidance amount unit 33 are configured separately from one another, but the present disclosure is not limited to such an example. Any two or more of these may be integrally configured as, for example, an integral application.

For example, first, external communication controller 30 may receive, based on communication between the object around the vehicle and radio apparatus 1, second movement information on the position and speed of the object from the object via radio apparatus 1. Guest OS 36 of external communication controller 30 then controls execution of at least of second avoidance amount unit 33. Thus, second avoidance amount unit 33 can specify the second travel control amount of the vehicle based on the second movement information. Here, the second travel control amount may be, for example, a second avoidance amount indicating the travel control amount required for avoiding a collision of the vehicle with the object of interest.

A function of external communication controller 30 will be described in more detail below. Second information acquirer 31 inputs, to second determiner 32, radio information received by radio apparatus 1. The radio information includes, for example, a position and speed of an object present around the vehicle, and the like.

Second determiner 32 inputs the radio information acquired by second information acquirer 31 and the above-described traveling information. Second determiner 32 then estimates, based on these pieces of information, for example, a speed of the vehicle, a position of the vehicle, a position of the object around the vehicle, and the like. In addition, similar to first determiner 22, second determiner 32 calculates a time until the vehicle collides with the object around the vehicle, based on these estimated pieces of information. The shorter the calculated time is, the higher the possibility that the vehicle will collide with the object around the vehicle (hereinafter referred to as "second possibility") is.

Second determiner 32 compares, for example, a value indicating the second possibility with a second threshold value with which it can be determined that the vehicle collides with the object around the vehicle. In a case where the value indicating the second possibility is equal to or greater than the second threshold value, second determiner 32 generates second avoidance control information indicating a control amount of the second avoidance travel required for avoiding a collision of the vehicle with the object around the vehicle, and inputs the resulting information to second avoidance amount unit 33.

Similar to the above-mentioned first avoidance travel, examples of the second avoidance travels include to assist braking by forcibly applying brakes, to change a course of the vehicle by forcibly changing a steering amount of the handle, lowering the speed of the vehicle by bringing the vehicle into an accelerator-off state even when a driver steps on the accelerator pedal, and the like.

Second avoidance amount unit 33 inputs the second avoidance control information and sets the second avoidance amount required for avoiding a collision of the vehicle with the object around the vehicle. Second avoidance amount unit 33 then generates second avoidance amount information indicating the second avoidance amount that has been set, and inputs the second avoidance amount information to travel controller 43. Similar to the above-mentioned the first avoidance amount, examples of the second avoidance amount includes a braking amount of the brake, a steering amount of the handle, and the like that are required for avoiding a collision of the vehicle with the object around the vehicle.

Guest OS 36 is an OS that controls execution of an application in which external communication controller 30 generates the second avoidance amount. The application is a second application for specifying the second travel control amount of the vehicle based on the second movement information on the position and speed of the object around the vehicle received from the object around the vehicle via the communication apparatus mounted on the vehicle (e.g., radio apparatus 1 or the like). Incidentally, the application may be the same as second avoidance amount unit 33 or may include at least second avoidance amount unit 33. Further, for example, ASIL-B may be applied to the application.

(Configuration of Travel Assistance Controller 40)

As illustrated in FIG. 1, travel assistance controller 40 includes, for example, map information acquirer 41, traveling information acquirer 42, travel controller 43, and guest OS 46. Here, travel controller 43 is an exemplary third application according to the present disclosure. Further, guest OS 46 is an exemplary second OS according to the present disclosure. Note that, in FIG. 1, an example is illustrated in which map information acquirer 41, traveling information acquirer 42, and travel controller 43 are configured separately from one another, but the present disclosure is not limited to such an example. Any two or more of these may be integrally configured as, for example, an integral application.

For example, travel assistance controller 40 first acquires, from object detector 20, the first travel control amount specified by object detector 20. Further, travel assistance controller 40 acquires, from external communication controller 30, the second travel control amount specified by external communication controller 30. Guest OS 46 included in travel assistance controller 40 may then control execution of at least travel controller 43. Thus, travel controller 43 may perform travel control of the vehicle based on at least one of the first travel control amount and the second travel control amount.

Alternatively, it is assumed that the first avoidance amount of the vehicle has been specified by object detector 20 and the second avoidance amount of the vehicle has been specified by external communication controller 30. In this case, travel assistance controller 40 may acquire the first avoidance amount from object detector 20 and acquire the second avoidance amount from external communication controller 30. Guest OS 46 included in travel assistance controller 40 may control execution of at least travel controller 43. Thus, travel controller 43 can perform the travel control of the vehicle based on at least one of the first avoidance amount and the second avoidance amount.

A function of travel assistance controller 40 will be described in more detail below. Map information acquirer 41 inputs the vehicle position information from GPS module 6. Map information acquirer 41 then sets the position of the vehicle on the map information of map DB 4 and inputs it to traveling information acquirer 42.

Traveling information acquirer 42 acquires the vehicle position information and vehicle speed information that have been set on the map information. Traveling information acquirer 42 then inputs these to first determiner 22 and second determiner 32, as traveling information.

Travel controller 43 inputs the first avoidance amount information and the second avoidance amount information that have been mentioned above and generates, based on these pieces of information, travel control information. The travel control information is information for controlling at least one of power train system 7, brake system 8, and steering system 9. The travel control information is, for example, the driving force control information, the braking force control information, the steering amount control information, or the like. Incidentally, when powertrain system 7 to which the travel control information has been input and/or the like is operated in accordance with the travel control information, the above-mentioned first avoidance travel and the second avoidance travel are executed.

Guest OS 46 is an OS that controls execution of the third application for performing travel control of the vehicle based on at least one of the first travel control amount (e.g., first avoidance amount and the like) and the second travel control amount (e.g., second avoidance amount and the like) that have been mentioned above. For example, the third application generates travel control information to be transmitted to a peripheral apparatus (such as power train system 7) based on at least one of the first travel control amount and the second travel control amount. The third application may be, for example, an application of automatic driving for performing travel control of a vehicle or a predetermined program for determining a travel control amount of the vehicle. Incidentally, the third application may be the same as travel controller 43 or may include at least travel controller 43. Further, ASIL-D may be applied to the application, for example. That is, the most stringent requirement for ensuring safety may be applied to the application.

(Hardware 60)

Hardware 60 includes a processor such as a Central Processing Unit (CPU), an Electronic Control Unit (ECU), and the like (none of them is illustrated) and provides an execution environment for a plurality of computer programs. Hardware 60 may be configured to include a single processor or a plurality of processors. The plurality of processors may constitute a travel assistance system according to the present embodiment.

(Hypervisor 50)

A virtual layer of hypervisor 50 is built on hardware 60. Hypervisor 50 may be virtualization software that is executed on hardware 60 and controls execution of a plurality of guest OSs 24 to 46. Hypervisor 50 allows different and a plurality of guest OSs 24 to 46 to be virtualized and mounted on hardware 60. That is, a plurality of virtual information processing apparatuses (virtual machines) can be realized on one information processing apparatus. An example of hypervisor-type virtualization software includes "COQOS Hypervisor SDK," "QNX Hypervisor," or the like, and these can be used in the present embodiment, but the virtualization software is not limited to these examples. In addition, a virtualization environment of travel assistance system 100 is not limited to the example of FIG. 1, and, for example, a layer of hypervisor 50 may be built on hardware 60, and layers of two guest OSs (e.g., guest OS 24 and guest OS 36) may be built thereon. Alternatively, a host OS may be built on hardware 60, then hypervisor 50 may be built, and layers of two guest OSs may be built thereon. Here, the host OS is an exemplary first OS or second OS according to the present disclosure.

As described above, hypervisor 50 enables travel assistance system 100 according to the present embodiment to operate a plurality of virtual machines in parallel. Therefore, for example, even when a trouble occurs in the applications or guest OS 46 each included in object detector 20, an operation of travel assistance controller 40 having a high safety requirement level can be continued without any impact of the trouble on the applications and guest OS 46 each included in travel assistance controller 40. That is, the robustness can be improved with respect to the travel control of the vehicle by travel assistance controller 40.

(Operation)

Figure 2:
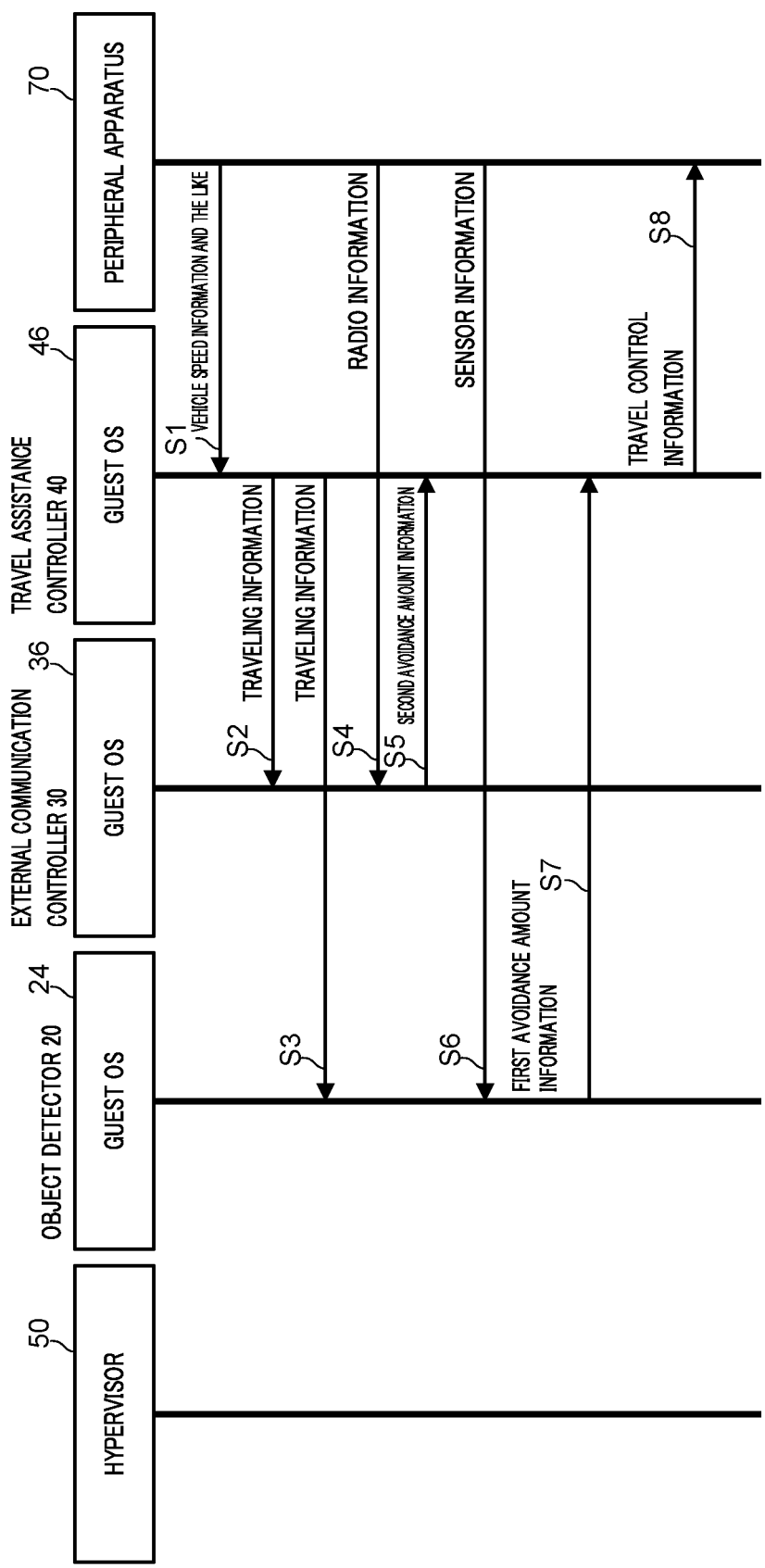
FIG. 2 is a sequence chart for describing an operation of travel assistance system 100.

Next, an operation of travel assistance system 100 will be described. First, with reference to FIG. 2, a description will be given of an operation of travel assistance system 100 when no trouble occurs in any of a plurality of guest OSs. FIG. 2 is a sequence chart for describing the operation of travel assistance system 100.

When guest OS 46 of travel assistance controller 40 receives vehicle position information, vehicle speed information, and the like transmitted from peripheral apparatus 70 (e.g., map DB 4, vehicle speed sensor 5, and the like) (step S1), inputs these pieces of information to object detector 20 and external communication controller 30, as traveling information (step S2 and step S3).

When guest OS 36 included in external communication controller 30 receives radio information received in radio apparatus 1 (step S4), second avoidance amount unit 33 included in external communication controller 30 generates second avoidance amount information based on the radio information and the traveling information. Guest OS 36 then inputs the generated second avoidance amount information to travel assistance controller 40 (step S5).

When guest OS 24 included in object detector 20 receives sensor information such as object detection information and object position information transmitted from peripheral apparatus 70 (e.g., camera 2, millimeter wave radar 3, or the like) (step S6), first avoidance amount unit 23 included in object detector 20 generates first avoidance amount information based on the sensor information and the traveling information. Guest OS 24 then inputs the generated first avoidance amount information to travel assistance controller 40 (step S7).

Thereafter, travel controller 43 included in travel assistance controller 40 generates travel control information based on the first avoidance amount information and the second avoidance amount information. For example, in a case where both the first avoidance amount information and the second avoidance amount information have already been input, travel controller 43 may generate the travel control information based only on the first avoidance amount information or may generate the travel control information based on a combination of the first avoidance amount information and the second avoidance amount information. Further, in a case where only the second avoidance amount information has already been input, travel controller 43 generates the travel control information based only on the second avoidance amount information.

Guest OS 46 of travel assistance controller 40 then inputs the generated travel control information to peripheral apparatus 70 (such as power train system 7) (step S8).

Guest OS Monitoring Processing Example 1

Figure 3:
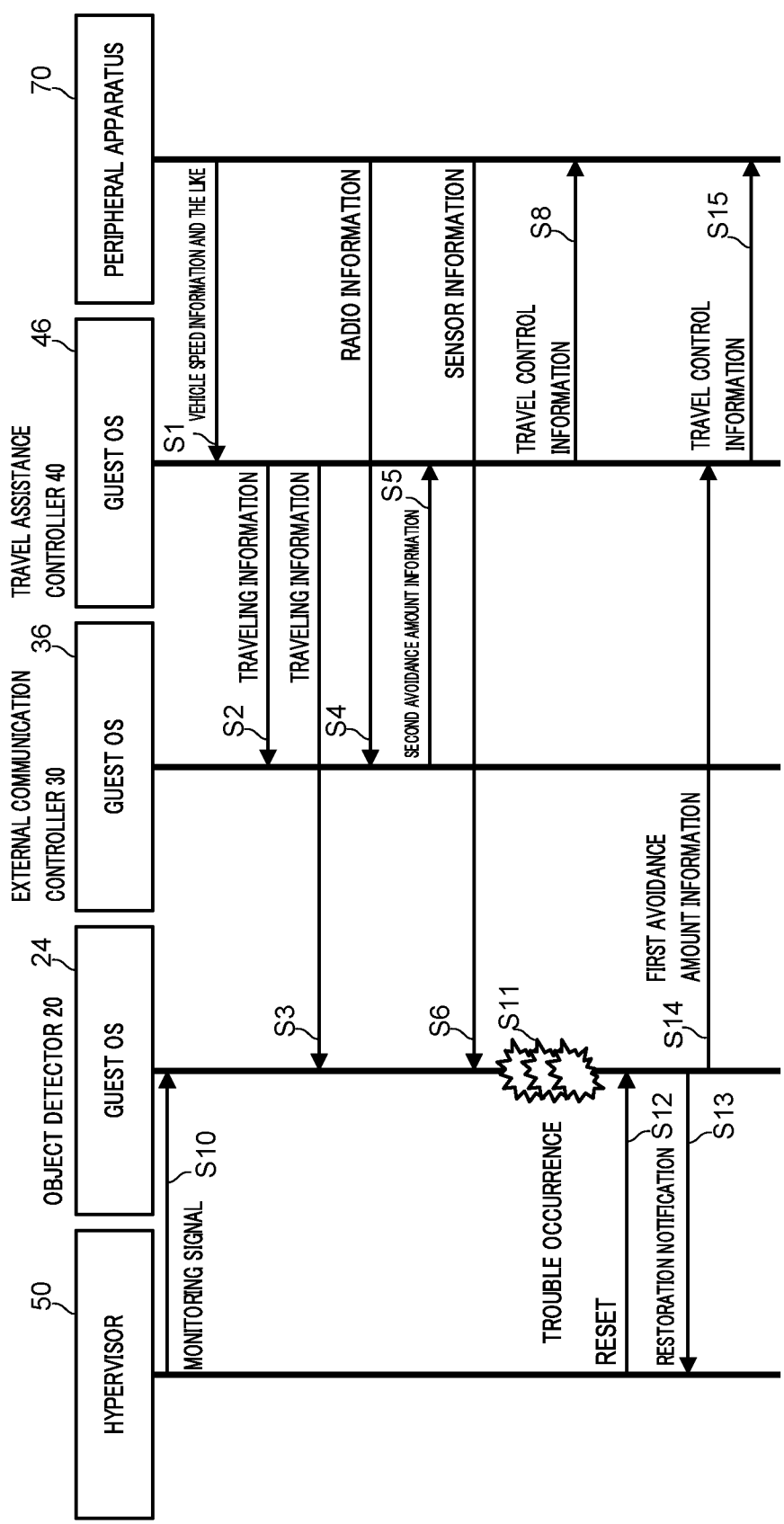
FIG. 3 is a sequence chart for describing an operation of travel assistance system 100 in a case where a trouble occurs in guest OS 24.

Next, with reference to FIG. 3, an operation will be described in which, for example, a trouble occurs in guest OS 24 and thereafter guest OS 24 is reset by hypervisor 50 and restored. FIG. 3 is a sequence chart for describing the operation of travel assistance system 100 when a trouble occurs in guest OS 24. In the following, a description of the processing similar to the processing illustrated in FIG. 2 will be omitted, and processing different from that illustrated in FIG. 2 will be described.

As illustrated in FIG. 3, first, hypervisor 50 transmits a monitoring signal for monitoring a status of each guest OS such as guest OS 24, in a fixed cycle, for example (step S10).

For example, in a case where a response signal to the monitoring signal is not returned within the fixed cycle from, e.g., guest OS 24, hypervisor 50 determines that a trouble has occurred in guest OS 24 (step S11).

When the trouble occurs in guest OS 24, hypervisor 50 transmits a reset signal to guest OS 24 (step S12). Upon restoration of guest OS 24 by input of the reset signal, guest OS 24 transmits, to hypervisor 50, restoration notification indicating that the restoration from the trouble is complete (step S13).

Thereafter, guest OS 24 that has been restored controls execution of at least first avoidance amount unit 23. Thus, first avoidance amount unit 23 generates first avoidance amount information. Guest OS 24 then inputs the generated first avoidance amount information to travel assistance controller 40 (step S14). Travel controller 43 included in travel assistance controller 40 generates travel control information based on the first avoidance amount information. Guest OS 46 included in travel assistance controller 40 then inputs the generated travel control information to peripheral apparatus 70 (such as power train system 7) (step S15).

Note that, for monitoring each guest OS, a monitoring-dedicated guest OS having a monitoring function or a plurality of guest OSs having the monitoring function may be used, instead of hypervisor 50. These configuration examples will be described with reference to FIGS. 4 to 7.

Guest OS Monitoring Processing Example 2

Figure 4:
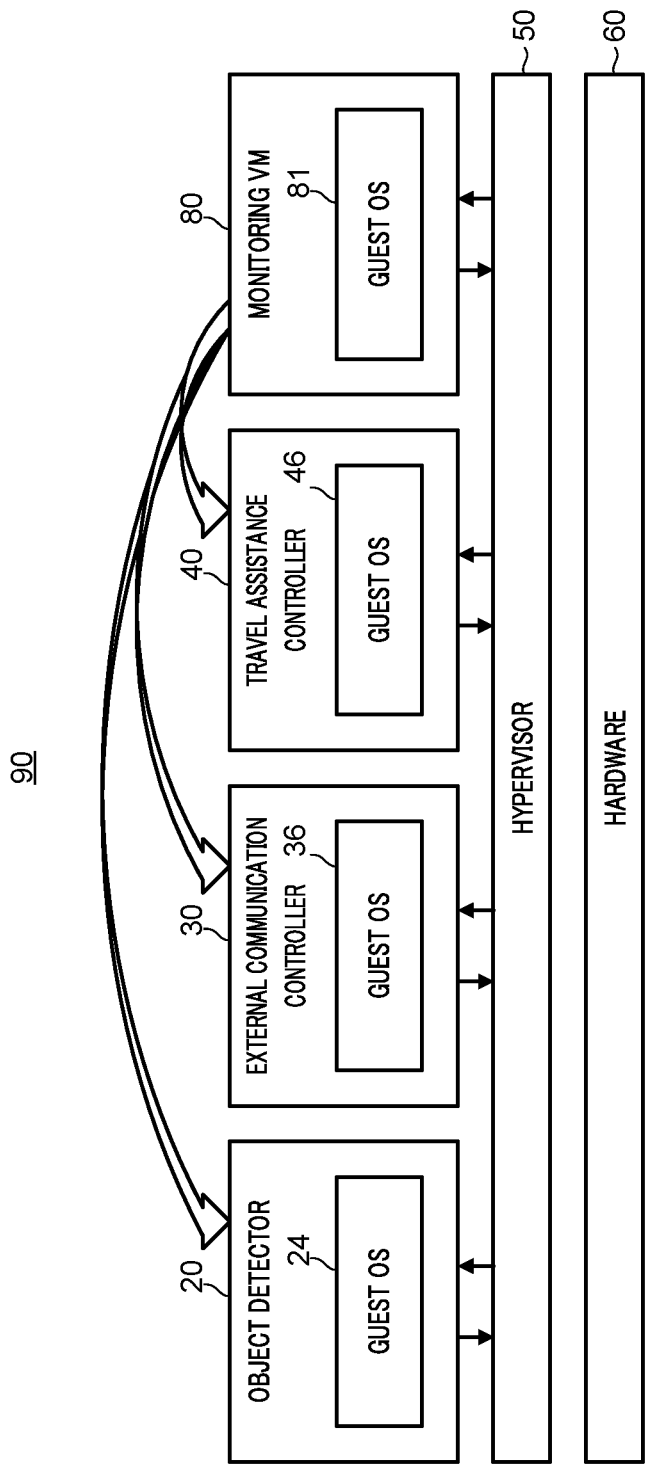
FIG. 4 illustrates another configuration example of travel assistance apparatus 90 according to the present embodiment.

FIG. 4 illustrates another configuration example of travel assistance apparatus 90 according to the present embodiment. FIG. 4 illustrates the configuration example of travel assistance apparatus 90 in a case where travel assistance apparatus 90 further includes a virtual monitoring apparatus (monitoring Virtual Machine (VM) 80) for monitoring each guest OS. However, the present disclosure is not limited to this example, and monitoring VM 80 may be provided in an apparatus other than travel assistance apparatus 90 (e.g., powertrain system 7 and the like). Further, as illustrated in FIG. 4, monitoring VM 80 includes guest OS 81. Incidentally, guest OS 81 is an exemplary third OS according to the present disclosure.

Guest OS 81 is an OS that controls execution of a fourth application for detecting an occurrence of a trouble related to at least one of guest OSs 24 to 46 described above. For example, the fourth application generates a monitoring signal that monitors guest OSs 24 to 46 and generates a reset signal that restores guest OSs 24 to 46 when a trouble occurs therein. Further, ASIL-D may be applied to the fourth application, for example. In the example illustrated in FIG. 4, different guest OSs 24 to 81 can be virtualized and mounted on hardware 60 by hypervisor 50.

Figure 5:
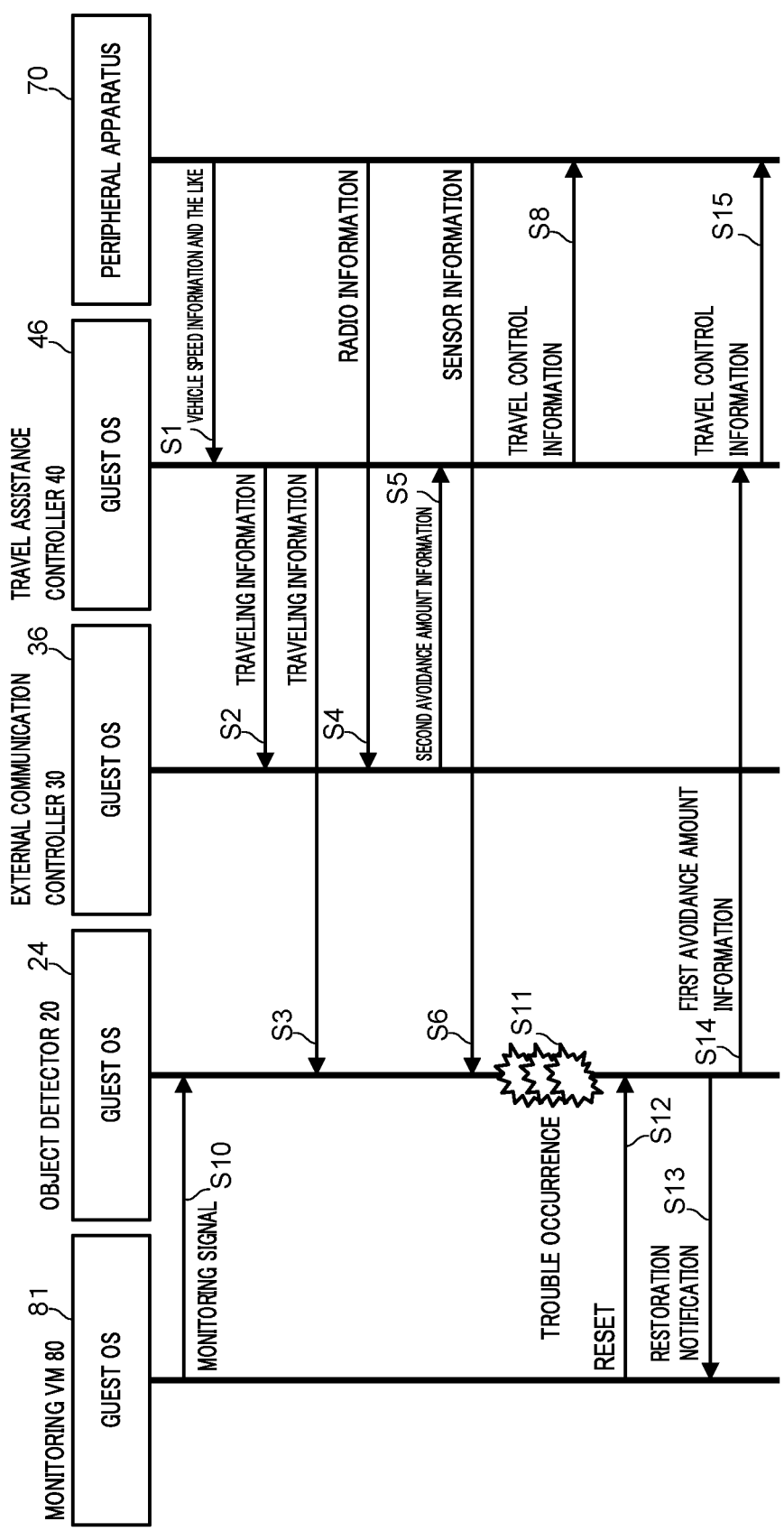
FIG. 5 is a sequence chart for describing an operation of travel assistance system 100 in a case where a trouble occurs in at least one of a plurality of guest OSs that are included in travel assistance apparatus 90 illustrated in FIG. 4.

FIG. 5 is a sequence chart for describing an operation of travel assistance system 100 in a case where a trouble occurs in at least one of the plurality of guest OSs that are included in travel assistance apparatus 90 illustrated in FIG. 4. As illustrated in FIG. 5, when a trouble occurs in guest OS 24, for example, guest OS 81 transmits a reset signal to guest OS 24 (step S12).

When guest OS 24 is restored by the reset signal, guest OS 24 transmits, to guest OS 81, restoration notification indicating that the restoration from the trouble is complete (step S13). According to this example, since monitoring guest OS 81 performs the monitoring processing, a processing load of hypervisor 50 can be reduced. Further, programming of hypervisor 50 can be also simplified.

Guest OS Monitoring Processing Example 3

Figure 6:
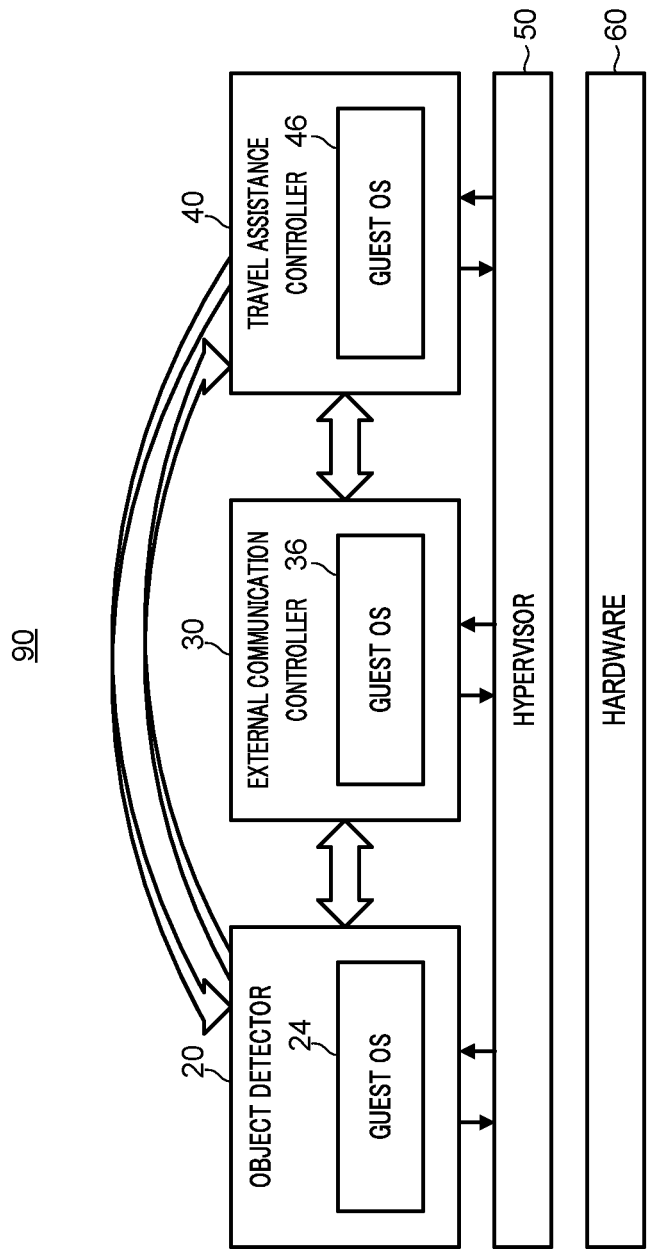
FIG. 6 illustrates yet another configuration example of travel assistance apparatus 90 according to the present embodiment.

FIG. 6 illustrates yet another configuration example of travel assistance apparatus 90 according to the present embodiment. FIG. 6 illustrates the configuration example of travel assistance apparatus 90 in a case where a plurality of guest OSs (e.g., guest OSs 24 to 46 and the like) included in travel assistance apparatus 90 each has a monitoring function for the other guest OSs. In this case, a plurality of guest OSs 24 to 46 each can monitor statuses of the others. For example, guest OS 36 included in external communication controller 30 may control execution of a fifth application for detecting an occurrence of a trouble related to guest OS 46 included in travel assistance controller 40. Guest OS 46 may also control execution of a sixth application for detecting an occurrence of a trouble related to guest OS 36.

Figure 7:
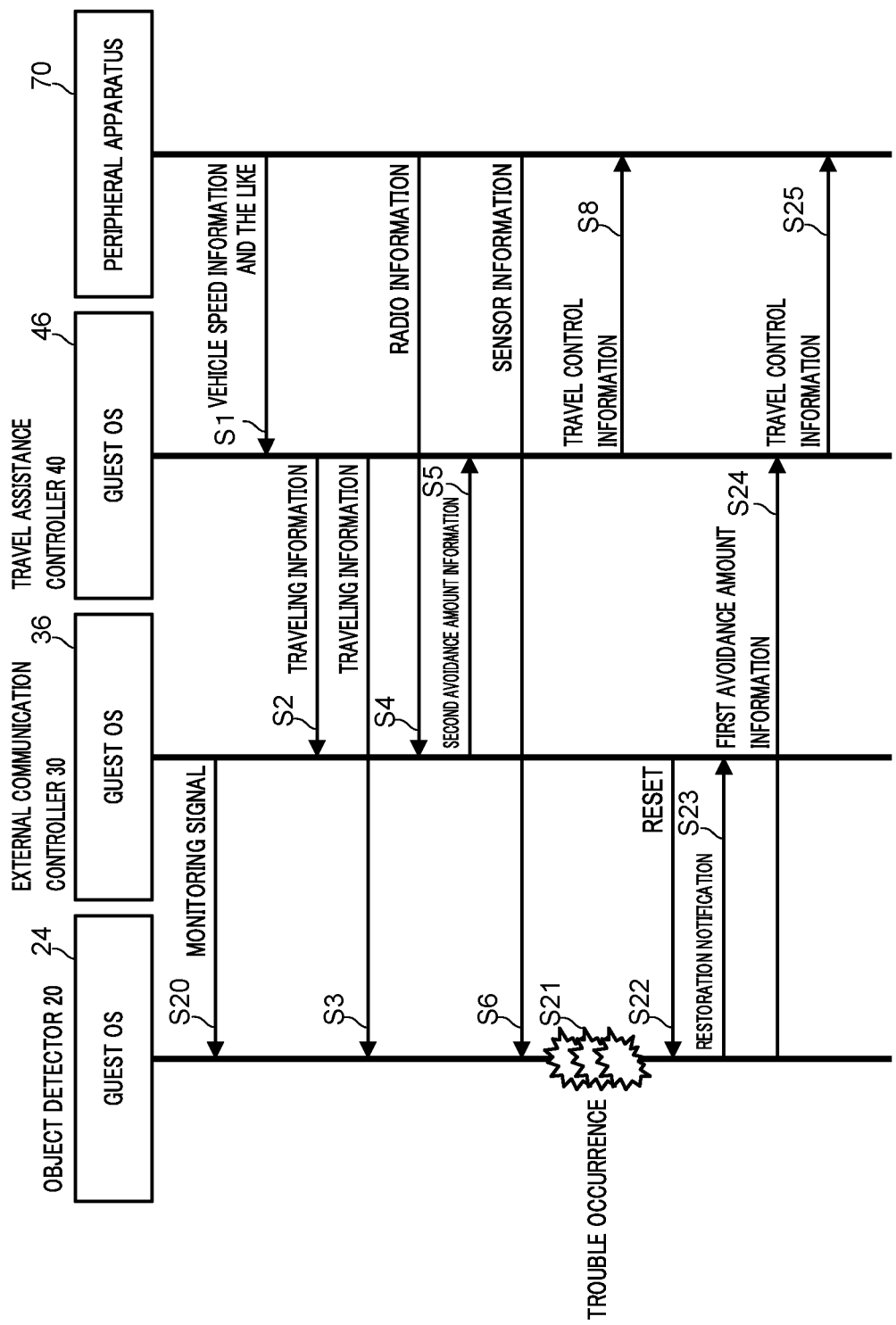
FIG. 7 is a sequence chart for describing an operation of travel assistance system 100 in a case where a trouble occurs in at least one of a plurality of guest OSs that are included in travel assistance apparatus 90 illustrated in FIG. 6.

FIG. 7 is a sequence chart for describing an operation of travel assistance system 100 when a trouble occurs in at least one of the plurality of guest OSs included in travel assistance apparatus 90 illustrated in FIG. 6. Incidentally, FIG. 7 illustrates an operation example in a case where guest OS 36 monitors a state of guest OS 24 and a trouble occurs in guest OS 24.

Guest OS 36 transmits a monitoring signal for monitoring the status of guest OS 24, in a fixed cycle, for example (step S20).

In a case where a response signal to the monitoring signal is not returned within the fixed cycle from guest OS 24, guest OS 36 determines that a trouble has occurred in guest OS 24 (step S21).

When the trouble occurs in guest OS 24, guest OS 36 transmits a reset signal to guest OS 24 (step S22). Upon restoration of guest OS 24 by input of the reset signal, guest OS 24 transmits, to guest OS 36, restoration notification indicating that the restoration from the trouble is complete (step S23).

Thereafter, guest OS 24 that has been restored controls execution of at least first avoidance amount unit 23. Thus, first avoidance amount unit 23 generates first avoidance amount information. Guest OS 24 then inputs the generated first avoidance amount information to travel assistance controller 40 (step S24). Thereafter, travel controller 43 included in travel assistance controller 40 generates travel control information based on the first avoidance amount information. For example, travel controller 43 may generate the travel control information based only on the first avoidance amount information or may generate the travel control information based on a combination of the first avoidance amount information and the second avoidance amount information that has been acquired in step S5. Guest OS 46 included in travel assistance controller 40 then inputs the generated travel control information to peripheral apparatus 70 (such as power train system 7) (step S25).

According to travel assistance system 100 illustrated in FIGS. 6 and 7, the status monitoring for each guest OS can be achieved by improving the existing guest OSs without preparing monitoring guest OS 81 dedicated to monitoring.

Effects

As described above, travel assistance apparatus 90 according to the present embodiment includes: a first Operating System (OS) that controls execution of at least one of a first application and/or a second application, the first application being for specifying a first travel control amount of a vehicle based on first movement information on a position and a speed of an object around the vehicle detected by a detection apparatus mounted on the vehicle, the second application being for specifying a second travel control amount of the vehicle based on second movement information on a position and a speed of the object received from the object via a communication apparatus mounted on the vehicle; a second OS that controls execution of a third application for performing travel control of the vehicle based on at least one of the first travel control amount and/or the second travel control amount; and a hypervisor that is executed on a processor and controls execution of the first OS and the second OS. The first OS corresponds to, for example, any of guest OS 24 and guest OS 36. The second OS corresponds to, for example, guest OS 46.

Thus, for example, hypervisor 50 can control execution of a plurality of guest OSs included in travel assistance apparatus 90 while switching the plurality of guest OSs. Thus, for example, even when a temporary trouble occurs in any of the plurality of guest OSs, an impact range of the trouble may remain only on each application (or processing) that may be controlled by the OS, so that a normal operation can be continued for the remaining guest OSs of the plurality of guest OSs and for applications that may be controlled by the guest OSs. Therefore, it is possible to prevent them from being inoperable. Accordingly, for example, even when first avoidance amount information cannot be generated due to a trouble occurrence in guest OS 24 included in object detector 20, guest OS 36 and the applications each included in external communication controller 30 can continue normal operations. This allows external communication controller 30 to normally generate second avoidance amount information, and thus, travel assistance controller 40 can continue to generate the travel control information by using the second avoidance amount information. That is, according to the present embodiment, it is possible to improve the robustness and/or stability with respect to the generation of the travel control information.

In addition, even when a trouble occurs in guest OS 24, guest OS 46 and applications each included in travel assistance controller 40 can continue normal operations, which can prevent inoperability thereof. That is, according to the present embodiment, it is possible to improve the robustness and/or stability with respect to the traveling control itself of the vehicle.

(Variation)

Hereinafter, a variation of the present embodiment will be described. For example, travel assistance apparatus 90 may further include another type of guest OS as well as the plurality of guest OSs mentioned above. For example, travel assistance apparatus 90 may further include a guest OS that controls execution of an application for generating an image displayed on a display apparatus which may be included in HMI 10. The guest OS may be virtualized and mounted on hardware 60 by hypervisor 50. Examples of the display apparatuses include a center display, a vehicle instrument panel provided in front of the driver seat, a head-up display, an electronic mirror, and the like.

Note that, types of the plurality of guest OSs (e.g., guest OS 24, guest OS 36, guest OS 46, and the like) in the above-mentioned embodiment may be all the same or may be different from one another. In the latter case, any two or more of the plurality of guest OSs may have the same type, and the remaining guest OSs may have another type. Alternatively, all guest OSs may have types different from each other.

It should be noted that, for example, the following aspects are understood that they are also within the technical scope of the present disclosure.

1. A first travel control amount is a first avoidance amount for avoiding a collision of a vehicle with an object, a second travel control amount is a second avoidance amount for avoiding a collision of the vehicle with the object, and a third application performs travel control of the vehicle based on at least one of the first avoidance amount and/or the second avoidance amount.
2. A hypervisor further detects occurrence of a trouble related to at least one of a first OS and/or a second OS.
3. In a case where occurrence of a trouble related to at least one of the first OS and/or the second OS is detected, the hypervisor performs processing on the OS for restoring the OS.
4. A travel assistance apparatus further includes a third OS that controls execution of a fourth application for detecting occurrence of a trouble related to at least one of the first OS and/or the second OS. The third OS may be an OS provided on hypervisor 50 or may be an OS virtualized and mounted on a processor (hardware 60) in parallel with hypervisor 50.
5. In a case where occurrence of a trouble related to at least one of the first OS and/or the second OS is detected, the fourth application performs processing on the OS for restoring the OS.
6. The first OS further controls execution of a fifth application for detecting occurrence of a trouble related to the second OS, and the second OS further controls execution of a sixth application for detecting occurrence of a trouble related to the first OS.
7. The fifth application performs processing on the second OS for restoring the second OS in a case where occurrence of a trouble related to the second OS is detected, and the sixth application performs processing on the first OS for restoring the first OS in a case where occurrence of a trouble related to the first OS is detected.
8. The first OS transmits, to the hypervisor, data indicating at least one of the first travel control amount and/or the second travel control amount, and the second OS receives, from the hypervisor, data indicating at least one of the first travel control amount and/or the second travel control amount.
9. At least one of the first OS and/or the second OS is a virtual OS.
10. The first OS controls execution of both the first application and the second application. In one example, the first OS performs sensor system control and inter-vehicle communication system control while the second OS performs the travel control.

11. The first OS controls execution of at least the second application, and the second OS further controls execution of the first application. In one example, the first OS performs the inter-vehicle communication system control while the second OS performs the sensor system control and the travel control.
12. A fourth OS that controls execution of the second application is further included, and the first OS controls execution of at least the first application. In one example, the first OS performs the sensor system control, the second OS performs the travel control, and the fourth OS performs the inter-vehicle communication system control.
13. A type of the first OS is associated with a type of the detection apparatus; and
   a type of the fourth OS is associated with a type of the communication apparatus.
14. A type of at least one of the first OS and/or the fourth OS may be different from a type of the second OS.
15. Robustness of a type of the second OS is higher than robustness of at least one of the first OS and/or the sixth OS. The robustness is an index indicating, for example the difficulty of error occurrence and the security performance level.
16. Real-timeness of a type of the second OS is higher than real-timeness of at least one of the first OS and/or the fourth OS. The real-timeness is an index indicating, for example, the performance or ability of an OS to complete specific processing within a predetermined time period.
17. The travel assistance apparatus further includes a processor.
18. A travel assistance system according to the present disclosure includes: a first Operating System (OS) that controls execution of at least one of a first application and/or a second application, the first application being for specifying a first travel control amount of a vehicle based on first movement information on a position and a speed of an object around the vehicle detected by a detection apparatus mounted on the vehicle, the second application being for specifying a second travel control amount of the vehicle based on second movement information on a position and a speed of the object received from the object via a communication apparatus mounted on the vehicle; a second OS that controls execution of a third application for performing travel control of the vehicle based on at least one of the first travel control amount and/or the second travel control amount; and a hypervisor that is executed on a processor and controls execution of the first OS and the second OS.
19. A travel assistance method according to the present disclosure is executed in a travel assistance apparatus, the travel assistance method including: controlling, by a first OS, execution of at least one of a first application and/or a second application, the first application being for specifying a first travel control amount of a vehicle based on first movement information on a position and a speed of an object around the vehicle detected by a detection apparatus mounted on the vehicle, the second application being for specifying a second travel control amount of the vehicle based on second movement information on a position and a speed of the object received from the object via a communication apparatus mounted on the vehicle; controlling, by a second OS, execution of a third application for performing travel control of the vehicle based on at least one of the first travel control amount and/or the second travel control amount; and controlling, by a hypervisor that is executed on a processor, execution of the first OS and the second OS.

Hereinabove, various embodiments have been described with reference to the drawings, it is needless to say that the present disclosure is not limited to such examples. It will be apparent to those skilled in the art may arrive at various modifications or variations at within the present disclosure, and it is naturally understood that they are also within the technical scope of the present disclosure. In addition, the components in the above embodiments may be optionally combined without departing from the spirit and scope of the disclosure.

While specific examples of the present invention have been described in detail thus far, these examples are merely illustrative and do not limit the appended claims. The art described in the appended claims includes various modifications and variations of the specific examples illustrated above.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2020-060566, filed on Mar. 30, 2020, the disclosure of which including the specification, drawings and abstract is incorporated herein by reference in its entirety.

INDUSTRIAL APPLICABILITY

An exemplary embodiment of the present disclosure is preferable for a travel assistance apparatus and a travel assistance system.

REFERENCE SIGNS LIST

1 Radio apparatus
20 Object detector
30 External communication controller
40 Travel assistance controller
50 Hypervisor
60 Hardware
90 Travel assistance apparatus
100 Travel assistance system

The invention claimed is:
1. A travel assistance apparatus, comprising:
a first Operating System (OS) that controls execution of at least one of a first application and/or a second application, the first application specifying a first travel control amount of a vehicle based on first movement information on a first position and a first speed of an object around the vehicle detected by a detection apparatus mounted on the vehicle, the second application specifying a second travel control amount of the vehicle based on second movement information on a second position and a second speed of the object received from the object via a communication apparatus mounted on the vehicle;
a second OS that controls execution of a third application and performs travel control of the vehicle based on at least one of the first travel control amount and/or the second travel control amount; and
a hypervisor that is executed on a processor and controls execution of the first OS and the second OS.

2. The travel assistance apparatus according to claim 1, wherein:
the first travel control amount is a first avoidance amount for avoiding a collision of the vehicle with the object;
the second travel control amount is a second avoidance amount for avoiding the collision of the vehicle with the object; and
the third application performs the travel control of the vehicle based on at least one of the first avoidance amount and/or the second avoidance amount.

3. The travel assistance apparatus according to claim 1, wherein the hypervisor further detects occurrence of a trouble related to at least one of the first OS and/or the second OS.

4. The travel assistance apparatus according to claim 3, wherein, in a case where the occurrence of the trouble related to the at least one of the first OS and/or the second OS is detected, the hypervisor performs processing on the at least one of the first OS and/or the second OS causing restoration of the at least one of the first OS and/or the second OS.

5. The travel assistance apparatus according to claim 1, further comprising a third OS that controls execution of a fourth application that detects occurrence of a trouble related to at least one of the first OS and/or the second OS.

6. The travel assistance apparatus according to claim 5, wherein, in a case where the occurrence of the trouble related to the at least one of the first OS and/or the second OS is detected, the fourth application performs processing on the at least one of the first OS and/or the second OS causing restoration of the at least one of the first OS and/or the second OS.

7. The travel assistance apparatus according to claim 1, wherein:
the first OS further controls execution of a fifth application that detects a first occurrence of a first trouble related to the second OS; and
the second OS further controls execution of a sixth application that detects a second occurrence of a second trouble related to the first OS.

8. The travel assistance apparatus according to claim 7, wherein:
the fifth application performs processing on the second OS that restores the second OS in a first case where the occurrence of the first trouble related to the second OS is detected; and
the sixth application performs processing on the first OS that restores the first OS in a second case where the second occurrence of the second trouble related to the first OS is detected.

9. The travel assistance apparatus according to claim 1, wherein:
the first OS transmits, to the hypervisor, first data indicating at least one of the first travel control amount and/or the second travel control amount; and
the second OS receives, from the hypervisor, second data indicating at least one of the first travel control amount and/or the second travel control amount.

10. The travel assistance apparatus according to claim 1, wherein at least one of the first OS and/or the second OS is a virtual OS.

11. The travel assistance apparatus according to claim 1, wherein the first OS controls execution of both the first application and the second application.

12. The travel assistance apparatus according to claim 1, wherein:
the first OS controls execution of at least the second application; and
the second OS further controls execution of the first application.

13. The travel assistance apparatus according to claim 1, further comprising a fourth OS that controls execution of the second application, wherein the first OS controls execution of at least the first application.

14. The travel assistance apparatus according to claim 13, wherein:
a first type of the first OS is associated with a first type of the detection apparatus; and
a second type of the fourth OS is associated with a second type of the communication apparatus.

15. The travel assistance apparatus according to claim 13, wherein a first type of at least one of the first OS and/or the fourth OS is different from a second type of the second OS.

16. The travel assistance apparatus according to claim 13, wherein a first robustness of a type of the second OS is higher than a second robustness of at least one of the first OS and/or the fourth OS.

17. The travel assistance apparatus according to claim 13, wherein first real-timeness of a type of the second OS is higher than second real-timeness of at least one of the first OS and/or the fourth OS.

18. The travel assistance apparatus according to claim 1, further comprising the processor.

19. A travel assistance system in a vehicle, the travel assistance system comprising:
a first Operating System (OS) that controls execution of at least one of a first application and/or a second application, the first application specifying a first travel control amount of a vehicle based on first movement information on a first position and a first speed of an object around the vehicle detected by a detection apparatus mounted on the vehicle, the second application specifying a second travel control amount of the vehicle based on second movement information on a second position and a second speed of the object received from the object via a communication apparatus mounted on the vehicle;
a second OS that controls execution of a third application and performs travel control of the vehicle based on at least one of the first travel control amount and/or the second travel control amount; and
a hypervisor that is executed on a processor and controls execution of the first OS and the second OS.

20. A travel assistance method executed in a travel assistance apparatus, the travel assistance method comprising:
controlling, by a first OS Operating System (OS), execution of at least one of a first application and/or a second application, the first application specifying a first travel control amount of a vehicle based on first movement information on a first position and a first speed of an object around the vehicle detected by a detection apparatus mounted on the vehicle, the second application specifying a second travel control amount of the vehicle based on second movement information on a second position and a second speed of the object received from the object via a communication apparatus mounted on the vehicle;
controlling, by a second OS, execution of a third application and performing travel control of the vehicle based on at least one of the first travel control amount and/or the second travel control amount; and controlling, by a hypervisor that is executed on a processor, execution of the first OS and the second OS.

\* \* \* \* \*